Feb. 25, 1958     E. E. GANGWER     2,824,510
EGG-FRYING DEVICE
Filed June 25, 1956     2 Sheets-Sheet 1
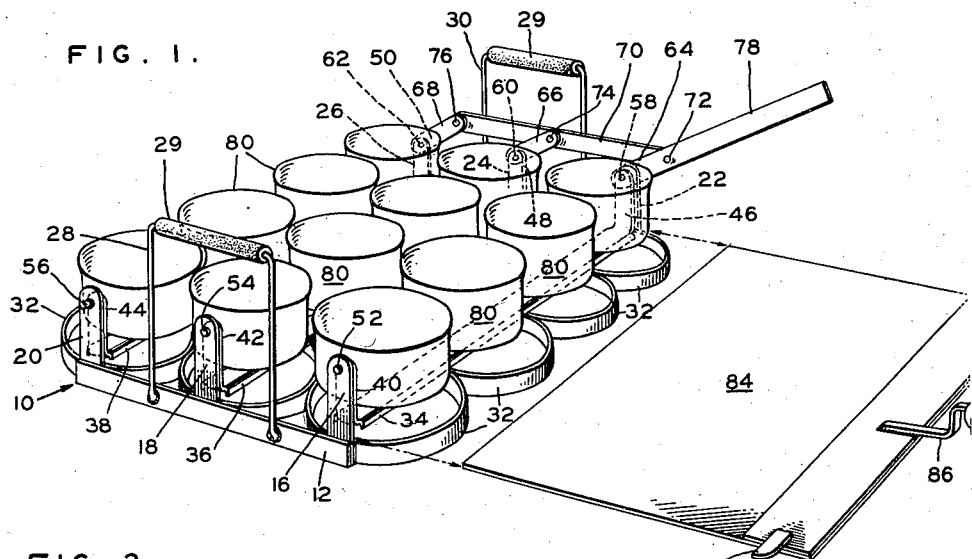
FIG. 1.
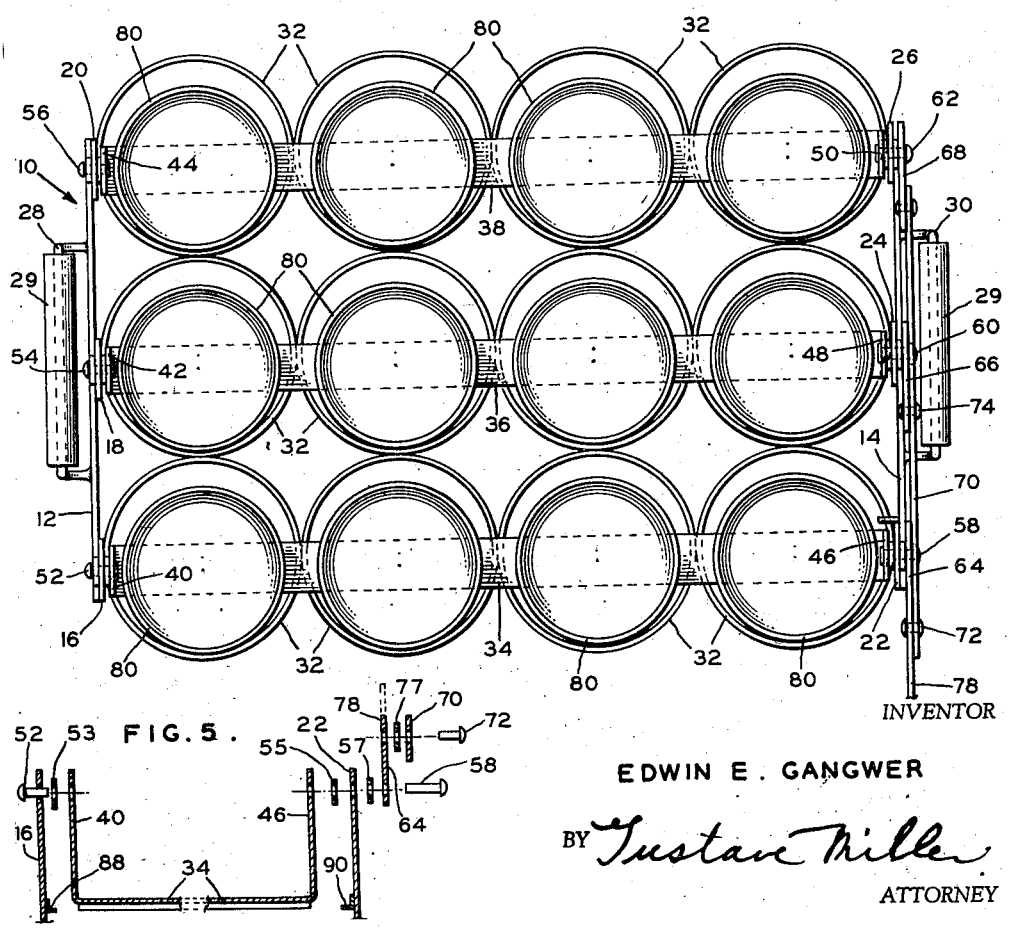
FIG. 2.
FIG. 5.
INVENTOR
EDWIN E. GANGWER
BY *Gustave Miller*
ATTORNEY Feb. 25, 1958     E. E. GANGWER     2,824,510
EGG-FRYING DEVICE
Filed June 25, 1956     2 Sheets-Sheet 2
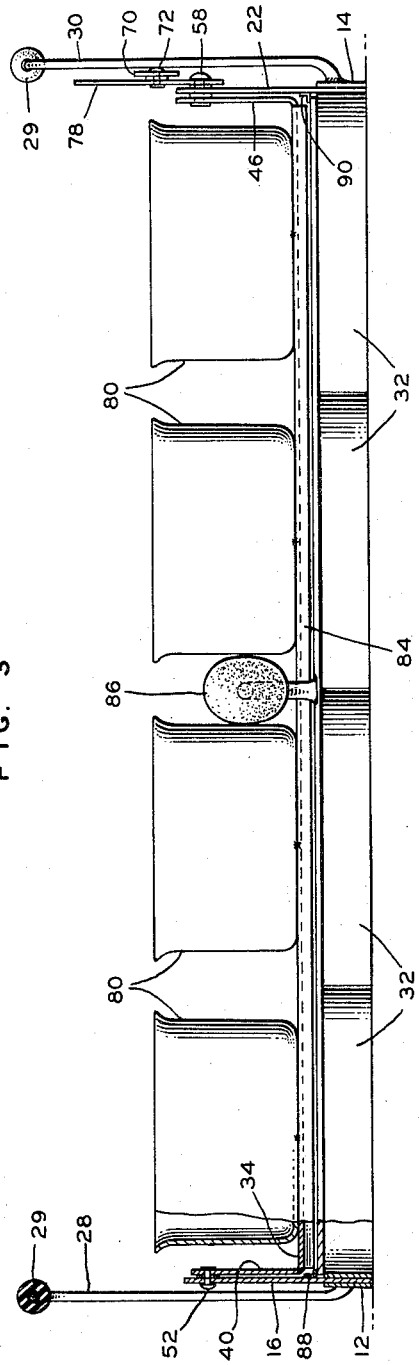
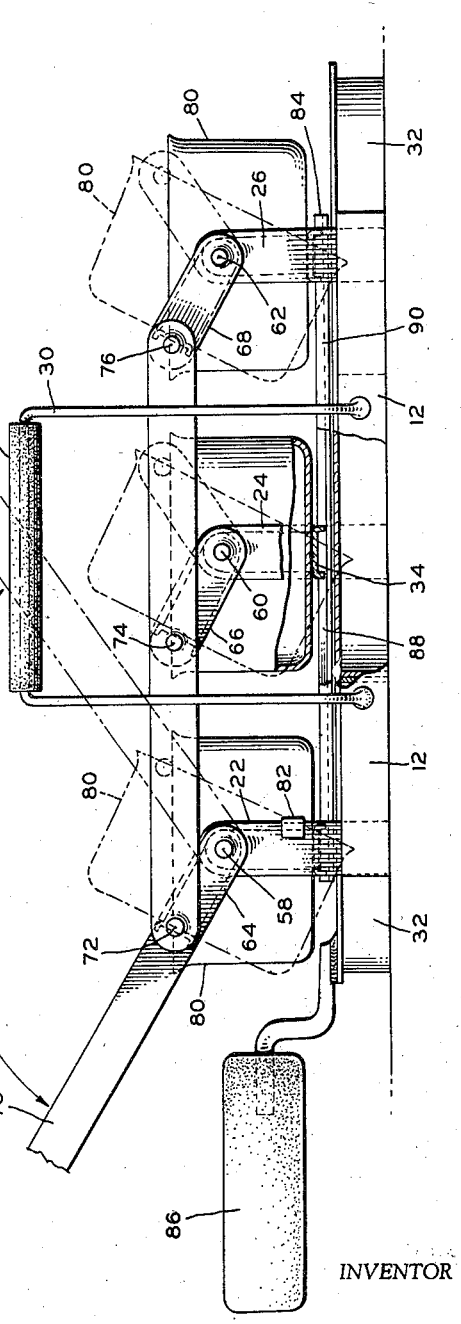
INVENTOR
EDWIN E. GANGWER
BY
ATTORNEY

United States Patent Office 2,824,510
Patented Feb. 25, 1958

2,824,510
EGG-FRYING DEVICE
Edwin E. Gangwer, Richmond, Va.

Application June 25, 1956, Serial No. 593,647

11 Claims. (Cl. 99—423)

This invention relates to a cooking device, and it particularly relates to a device for frying a plurality of eggs simultaneously.

It is often difficult to simultaneously fry many eggs in individual portions since each egg must be individually broken, examined and then dropped onto the grill or pan. Since, once the egg is dropped on the grill it cooks rapidly, by the time the last egg is dropped on the grill, the first eggs are completely cooked and are ready to be served. This means that some persons must be served first while the others must wait. Since eggs of this type must be eaten while hot, those who are first served cannot wait for the others but must eat their eggs while the others are still waiting to be served. This waiting period is even longer if the eggs must be provided with a basted film since this requires additional time to take care of the eggs being cooked before attention can be given to any additional eggs.

It is one object of the present invention to overcome the above difficulty by providing a device which is capable of quickly and easily frying a great number of eggs or egg portions simultaneously.

Another object of the present invention is to provide an egg-frying device for frying many eggs simultaneously, which is simple in construction, is not easily subject to breakage and requires no special skill for its use.

Another object of the present invention is to provide an egg-frying device for frying many eggs simultaneously, which can be easily cleaned after use.

Other objects of the present invention are to provide an improved device for frying eggs, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a perspective view of a device embodying the present invention, the cover portion being shown removed.

Fig. 2 is a top plan view of the device of Fig. 1, without the cover portion.

Fig. 3 is a front elevational view, partially broken away in section, of the device of Figs. 1 and 2.

Fig. 4 is a side view, partly in elevation and partly in section, of the device.

Fig. 5 is an exploded, fragmentary, sectional view of the device, showing the pivotal connections in detail.

Referring now in greater detail to the drawings wherein similar reference characters refer to similar parts, there is shown a frame, generally designated 10, which comprises a pair of bars 12 and 14, each of which is provided with three spaced, vertical posts, as at 16, 18 and 20 on bar 12, and at 22, 24 and 26 on bar 14. Each bar is further provided with an upstanding handle, as at 28 and 30, having an insulating sleeve 29 thereon.

Positioned between the bars 12 and 14 are three rows of rings 32. These rings 32 are shown as being arranged in three rows of four rings each. However, the number of rows and the number of rings in each row may be varied as desired.

Pivotally connected at each end to corresponding, opposed posts, are three bars 34, 36 and 38. The bar 34 is pivoted between posts 16 and 22, bar 36 between posts 18 and 24, and bar 38 between posts 20 and 26. These pivotally connected bars are each provided with perpendicular, upstanding arms or flanges at each end, as at 40, 42, 44, 46, 48 and 50; and it is these arms or flanges which form the pivotal connections with the posts, as by means of rivets 52, 54, 56, 58, 60 and 62 and rivet heads, and spacing washers as indicated at 53, 55, and 57.

At one end of each of the bars 34, 36 and 38, there is provided a link, as at 64, 66 and 68; each of these links being pivoted both to the corresponding posts 22, 24, and 26 and to the corresponding flanges 46, 48 and 50, as by the pivot rivets 58, 60 and 62 and spacing washers 55 and 57 used in conjunction with each of these rivets. These links are also pivoted at their opposite ends to a crank bar 70, as by rivets 72, 74, and 76, and spacing washer such as 77. The link 64 is integral with lever 78 which is adapted to actuate crank bar 70.

Fixedly positioned on each support bar 36 is a row of cups 80. As shown, there are four cups to each row to correspond to the number of rings 32 in each row. The number of cups will, of course, vary in accordance with the number of rings.

Each cup 80 overlies a ring 32, but is not coaxial therewith. The cups are, instead, positioned somewhat eccentrically relative to their corresponding rings, as best shown in Fig. 2. The reason for this is because the cups are tiltable along with their supporting bars when these bars are pivoted. As the cups tilt, their open tops move somewhat forwardly in the horizontal plane. If they were not eccentrically mounted relative to the rings, the contents of such cups would fall, in part outside the rings. By positioning the cups in a predetermined eccentric position, when they are tilted, the contents thereof will fall directly within the rings.

The support bars 34, 36 and 38 are pivoted, and the cups thereon are tilted, by pushing the lever 78 forwardly. When the lever is released, the weight of the cups returns the lever to the normal position automatically, making no effort necessary on the part of the operator. A stop 82 is positioned on post 22 to limit the pivotal movement of flange 46 and, thereby, of the entire array of pivoted cups.

In operation, one, two or any number of eggs which form a portion or serving, after being broken into a separate cup or bowl for inspection, are poured into each cup 80 while the entire device is removed from a grill. After the cups are filled, the entire assembly is then moved bodily over the grill. When it is in position over the grill, with the rings 32 resting on the grill, the lever 78 is pushed forward to tilt the cups and pour their contents into the areas on the grill which are bounded by the respective rings. Since all the eggs are poured onto the grill simultaneously, they will be fried simultaneously and can be removed simultaneously.

The rings each form an individual pan, in conjunction with the grill, to limit the lateral flow of the eggs. After the eggs have been fried, the device is removed bodily, for re-filling, if desired, by means of the handles 28 and 30, and the fried eggs can then be removed from the grill in the ordinary manner.

If it is desired to steam-baste the eggs so as to form a film over the yolks, a plate 84 is provided for this purpose. This plate is equipped with a handle 86 by means of which it may be manipulated. A channel or guideway 88 is provided along the inner side of bar 12 and another, similar channel or guideway 90 is provided along the inner side of bar 14 as seen in Figs. 3, 4 and 5, but omitted in Figs. 1 and 2 for clarity of illustration. These guideways are formed by narrow angle-bars. The plate 84 is adapted to slide into the space between the tops of the rings 32 and the support bars 34, 36 and 38 so that it sealingly overlies and rests on the rings. This sliding movement takes place by fitting the side edges of the plate onto the guideways 88 and 90 formed by the angle-bars and pushing on the handle 86. A stop 96 may be provided on either one or both side edges of the plate. This stop 96 limits forward movement of the plate beyond a predetermined limit by abutting against post 16.

The entire device is preferably constructed of stainless steel except for the handle portions which are preferably constructed of a heat-resistant synthetic resin.

Although this invention has been described in considerable detail, such description is intended as being illustrative rather than limiting, since the invention may be variously embodied, and the scope of the invention to be determined as claimed.

Having thus set forth and disclosed the nature of this invention, what is claimed is:

1. An egg-frying device comprising a frame including a plurality of rings positioned horizontal and laterally of each other with the bottom edges of said rings in a common plane and adapted to be placed on a hot grill, a plurality of cups pivotally connected to said frame for tilting movement, said cups being so arranged that each overlies a corresponding ring, and means to simultaneously tilt said cups over their respective rings to thereby position each cup contents within its respective ring and on the grill to thus provide a plurality of separate ration portions on the hot grill for simultaneous frying.

2. The device of claim 1 wherein each of said cups is positioned on an axis which is eccentric to the axis of its corresponding ring.

3. The device of claim 1 wherein guideways are provided on opposite sides of said frame, between said cups and said rings and a cover plate is slidable on said guideways into and out of a position overlying and resting on said rings.

4. An egg-frying device comprising a frame which includes a pair of oppositely positioned bars, a pluarlity of spaced posts extending upwardly from each of said bars, each of the posts of one bar being aligned with a corresponding post on the other bar, a support bar pivotally connected between each pair of aligned posts, a plurality of aligned cups on each support bar, a plurality of rings connected between each bar of said frame and underlying said cups in vertically-spaced position relative thereto, the bottom edges of each ring being in a common plane and arranged to be placed on a hot grill each of said rings underlying an individual cup, means for simultaneously pivoting said support bars to tilt said cups over said rings to thereby deposit the contents of each cup within its respective ring for simultaneous frying to provide separate ration portions, and handle means on said frame to enable a bodily lifting of said device.

5. The device of claim 4 wherein said cups are positioned on said support bars in such a manner that they are axially eccentric to their corresponding rings.

6. The device of claim 4 wherein each of the bars of said frame are provided with inwardly extending guideways, said guideways being positioned in a common plane intermediate said rings and said support bars, and a cover plate slidable on said guideways to cover said rings.

7. The device of claim 6 wherein a limit-stop means is provided on said plate to limit the sliding movement thereof relative to said frame.

8. An egg-frying device comprising a frame, a plurality of laterally arranged rings on said frame, a plurality of cups arranged for tilting over said rings, and means for tilting said cups connected to said frame, said rings being arranged tangentially to each other and said cups being arranged so that each cup overlies a ring, the bottom edges of each ring being in a common plane and adapted to be placed on a hot grill for simultaneous frying of the cup contents in separate ration portions.

9. The device of claim 8 wherein said cups and their corresponding rings are axially eccentric relative to one another.

10. The device of claim 8 wherein said rings and cups are arranged in corresponding rows.

11. The device of claim 8 wherein means are provided between said rings and said cups to slidably support a cover member for said rings.

References Cited in the file of this patent

UNITED STATES PATENTS 797,121     Keller _____ Aug. 15, 1905

FOREIGN PATENTS 1,926     Great Britain _____ Dec. 15, 1900